Dec. 18, 1945.  W. F. MITCHELL  2,391,183
CENTERING MEANS FOR BORING MACHINES
Original Filed March 18, 1943  2 Sheets-Sheet 1
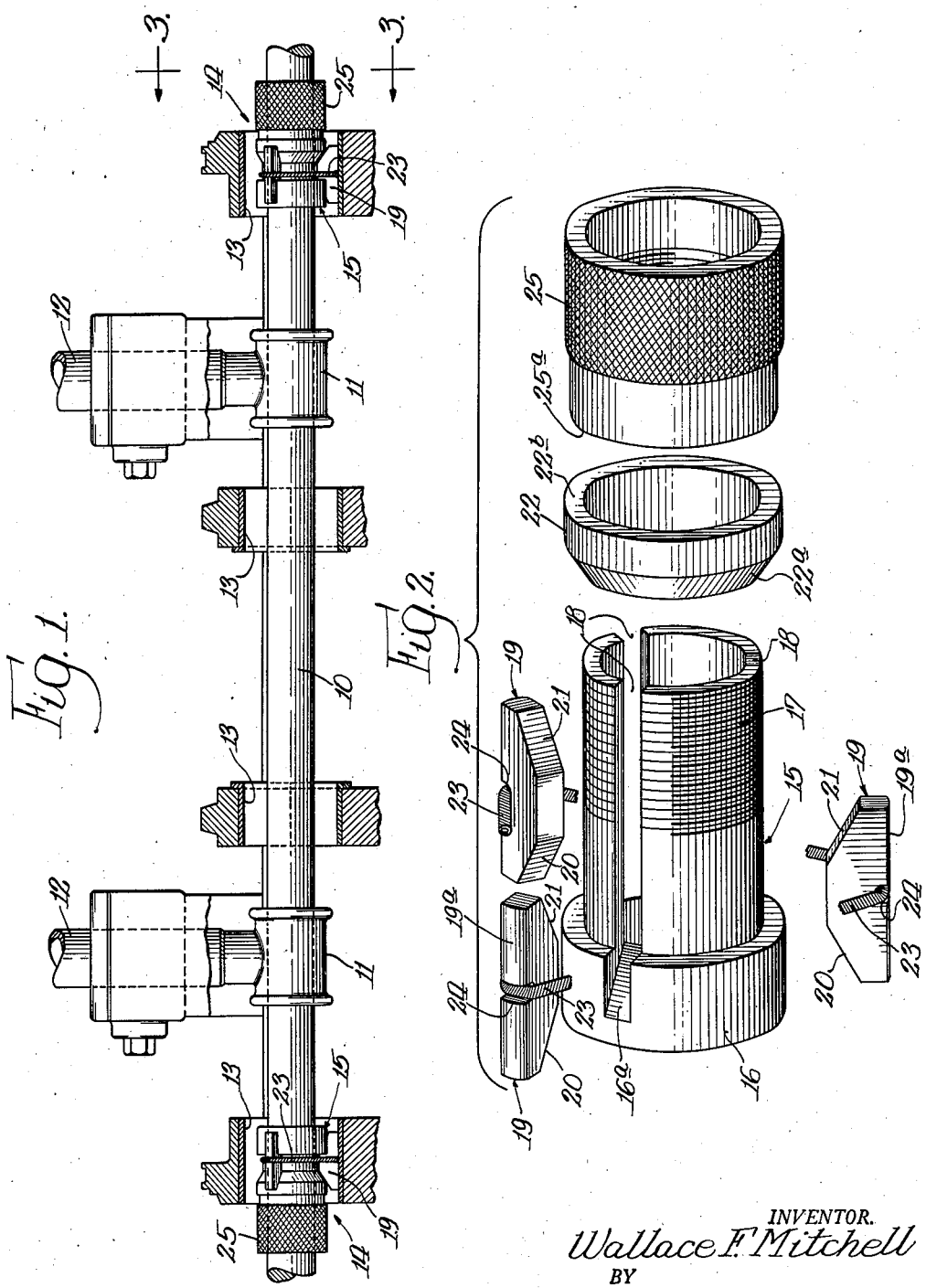
INVENTOR.
Wallace F. Mitchell
BY
Davis, Lindsey, Smith & Shonts
Attys.

Dec. 18, 1945. W. F. MITCHELL 2,391,183
CENTERING MEANS FOR BORING MACHINES
Original Filed March 18, 1943 2 Sheets-Sheet 2
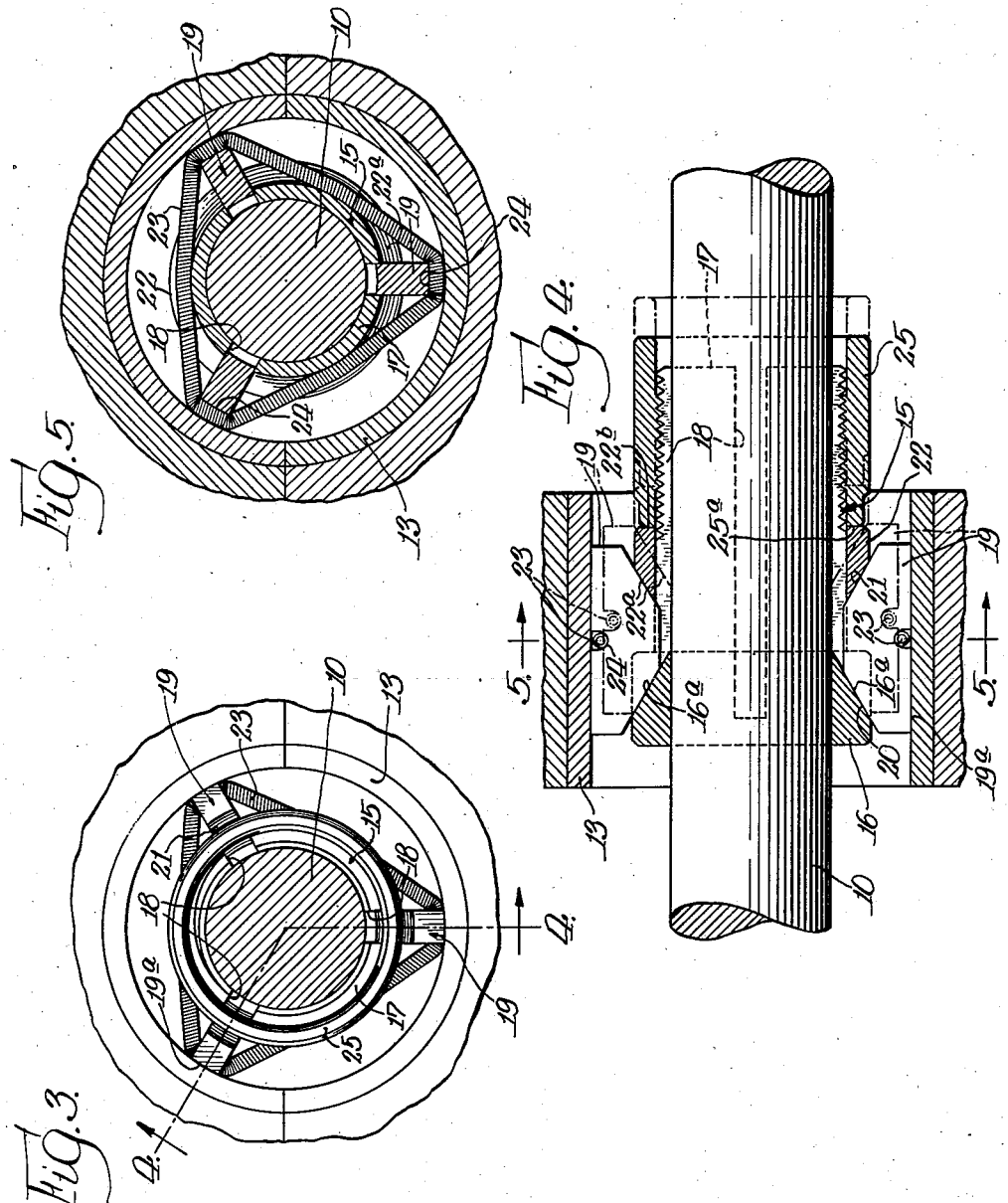
INVENTOR.
Wallace F. Mitchell,
BY
Davis, Lindsey, Smith & Shonts
Attys.

Patented Dec. 18, 1945

2,391,183

UNITED STATES PATENT OFFICE 2,391,183

CENTERING MEANS FOR BORING MACHINES

Wallace F. Mitchell, Chicago, Ill., assignor to Automotive Maintenance Machinery Co., North Chicago, Ill., a corporation of Illinois Original application March 18, 1943, Serial No. 479,579. Divided and this application February 17, 1944, Serial No. 522,765

12 Claims. (Cl. 77—55)

My invention relates generally to boring machines adapted for the boring of one or a plurality of so-called in-line bearings; and it has to do particularly with means for centering a boring bar relative to the bearing to be bored. This application is a division of my copending application Serial No. 479,579, filed May 18, 1943, for Boring machine.

Heretofore, in the use of machines for boring bearings, it has been necessary to use so-called centering rings to properly center the boring bar in the bearing to be bored. This prior operation requires disassembly and reassembly of the bearings in the centering operation. In the use of centering rings a great number of different size rings are necessary in order to take care of different size bearings and, as will be appreciated, it is impractical to have available at all times the rings of proper size to effect proper centering operations. Therefore, an object of the present invention is to provide improved centering means for aligning the boring bar with the bearings to be bored, the arrangement being such that the boring bar may be centered in respect to a wide range of bearing sizes without dismantling the bearings or removing the boring bar.

Another object is to provide a centering device of the foregoing character which is simple in construction, easy to operate, and may be manufactured at a low cost, and which is so constructed and arranged that the boring bar may be positively, accurately and rapidly centered with respect to bearings to be bored.

A further object is to provide an arrangement for boring bearings of an engine or the like without disturbing bearing caps and inserts, the latter remaining in normal assembled condition during the complete operation.

A more specific object is to provide a centering fixture of the foregoing character which is adapted through a single adjustment to center itself within the bearing to be bored and to also center the boring bar within the fixture and with respect to such bearing.

Other objects and advantages will become apparent as this description progresses and by reference to the drawings wherein—

Figure 1 is a longitudinal sectional view of a line boring tool including a boring bar having centering means embodying my invention applied thereto for centering the boring bar with respect to the bearings to be bored;

Fig. 2 is an enlarged separated assembly view of the centering fixture shown in Fig. 1;

Fig. 3 is an enlarged end view taken substantially on line 3—3 of Fig. 1;

Fig. 4 is a vertical sectional view taken substantially on line 4—4 of Fig. 3; and Fig. 5 is a transverse sectional view taken substantially on line 5—5 of Fig. 4.

In Fig. 1 of the drawings there is illustrated, in part, a line boring machine which is shown and described in full detail in my said copending application Serial No. 479,579. This machine includes a boring bar 10 which is rotatably supported by a plurality of spaced-apart bearings 11 carried by universally mounted bearing supports 12. The boring bar, in use, is centered with respect to a plurality of bearings 13 which are to be bored and when so centered the supports 12 are locked in that condition as more particularly explained in my said copending application.

The present application has to do particularly with a fixture 14 which I employ for centering the boring bar 10 in the bearings 13. This fixture 14 is adapted for easily and quickly centering the boring bar with a minimum of manipulation of parts. The bearing need not be disturbed for this purpose and a single fixture will serve for centering the boring bar in a wide range of bearing sizes. It is to be understood that although my invention is particularly suited for the work just stated, it can be used and has utility in connection with the boring of bearings of any kind where similar conditions of use are to be met and wherever the mechanism is capable of installation for utilization of the advantages to be attained through it.

More particularly, the centering fixture takes the form of a tubular body 15 having an enlarged head 16 and a reduced threaded shank 17, the shank being slotted at 18 to provide a plurality (preferably three) of spaced compressible segments. The inner ends of the shank slots 18 terminate in the head 16 in such a way as to provide thereat tapered shoe-supporting surfaces 16$^a$ which serve as camways for supporting the inward ends of a plurality (preferably three) of expansible jaws or shoes 19. The jaws 19 are identical and each is provided with an outer elongated rounded face 19$^a$ and an inner face tapered at its opposite ends as at 20 and 21. The surface 20 is tapered complementally to the camway seats 16$^a$ formed in the body head and the other surface 21 is tapered complementally to the conical seat 22$^a$ of an expanding centering cone 22 which is freely slidable over the shank 17 to the position indicated in Fig. 4 where, together with the seat 16$^a$ of the body, it supports the jaws 19 for expanding and contracting movement. The jaws 19 are seated and maintained against the seats 16$^a$ and 22$^a$ by an external garter type spring 23 seated in grooves 24 in the outer central portions of the jaws 19. The expanding cone 22 is maintained in its jaw-supporting condition by a sleeve 25 which threadedly engages the threaded shank 17 of the body 15. The forward edge 25$^a$ of the sleeve 25 abuts the rear edge 22$^b$ of the cone 22 to hold it in position. It will be seen that the sleeve or collar 25 may be turned clockwise to move the cone 22 toward the body head 16 and to thereby expand the jaws 19 and it may be moved in the opposite direction to contract such jaws cooperatively with the spring 23.

When it is desired to bore the crank shaft bearing, such as illustrated at 13 in Fig. 1, the centering fixture is applied to the end bearings (Fig. 1) and the collar or sleeve 25 is then rotated clockwise to expand the jaws 19 until they engage the inner wall of the respective bearing 13, thereby centering the fixture itself with respect to the bearing. To insure proper support and centering action it is desirable that one of the jaws 19 be located on the underside of the fixture, as illustrated in Fig. 5, wherein it supports the weight of the boring bar while the other two jaws, in expanding, take care of lateral or horizontal alignment. These upper jaws, together with the lowermost jaw, also take care of vertical alignment so that when the jaws are all engaged with the bearing the fixture itself is centered in the bearing. To accomplish this the jaws are located at spaced intervals of approximately 120°.

After the jaws 19 are firmly engaged with the bearing 13, the sleeve or collar 25 may be further tightened and in doing so the flexible segments of the body shank 17 are uniformly contracted into tight gripping engagement with the boring bar 10. This action takes place due to the tendency of the threads of the collar to grip or slip over the threads of the shank 17. In other words, I rely upon the camming action of the threads after the jaws are tightly set up, preventing normal turning of the sleeve in clockwise direction to effect a clamping action around the bar. This is a collet-like action wherein the different segments of the shank 17 contract uniformly and in doing this they in turn center the boring bar within the bearing centered fixture. This centering fixture eliminates the necessity of using centering rings as heretofore. In the use of centering rings they had necessarily to fit freely so as to readily slide along the boring bar and in doing so presented an error in the centering action. In the present arrangement that error is avoided by firmly clamping the bearing in a tight-fitting centered condition which would be impractical in the use of centering rings. This fixture also lends itself to proper centering without removal of the bearing caps or without disturbing the bearing in any manner after the boring bar centering and aligning operation has been performed. In the use of centering rings the bearing had to be dismantled both before and after the centering operation and this, as hereinabove pointed out, also tended to create error, particularly in the disassembly and assembly of the bearing after the use of the centering rings in the centering of the bearings. I prefer to effect the centering operation within or from the bearing 13 itself but, if desired, the centering may be accomplished from the motor block. In other words, one can center either after the bearing has been inserted or before the bearing is inserted, preferably, though, after the bearing has been inserted.

In setting up the machine to bore the bearings 13 (Fig. 1), I first insert the boring bar 10 in the respective bridge bearings 11 and also through the centering fixtures, which are, at that time, in place in the respective end bearings. When I have done that I then center the boring bar 10 in the end bearings 13 as hereinabove explained. After having centered the boring bar 10 in the end bearings, the bearing supports 12 are secured, thus securing the boring bar and its bearings in proper centered condition with respect to the bearings to be bored. After the boring bar 10 is thus fixed in its centered condition, the centering fixture is then removed. To this end the centering fixtures are merely released sufficiently to permit them to move readily in the respective bearings and upon the boring bar. The boring bar is then manually moved longitudinally, first one end and then the other, to an extent sufficient to permit the removal of the centering fixture from the end thereof, the boring bar being removed from any bearing supports that may be disposed outwardly beyond the bearings in which the centering fixtures are located. In each instance, while the boring bar is removed from its endmost bearing supports, it is supported by the remaining bearings so that no disalignment occurs because of this operation. After the centering fixtures have been removed and the boring bar is restored to its fully supported, aligned position, the machine is then ready to be driven for the boring operation.

I believe that the advantages of my invention will be obvious from the foregoing description. The tool may be centered easily and quickly for the boring operation. The boring operation may be carried out with a higher degree of accuracy than heretofore. This is accomplished by the facile and accurate manner of centering the boring bar and the reduced number of manipulations required to accommodate the tool to the boring operation. This is also aided by the fact that my invention eliminates the necessity of centering rings or the like, thereby avoiding assembly and disassembly of the boring bar therein.

I claim:

1. In a machine for boring the bearings of an engine cylinder block, a boring bar, means for centering said boring bar in the bearings to be bored which includes a cylindrical body member adapted to receive said boring bar and having a part compressible upon the boring bar, expansible centering members carried by said body member and adapted to engage the wall of a bearing to be bored, and means for expanding said expansible members including a member carried by said compressible body part for first expanding said expansible members and then compressing said compressible part when said expansible members are no longer expansible because of engagement with a bearing.

2. In a machine for boring the bearings of an engine cylinder block, a boring bar, means for centering said boring bar in the bearings to be bored which includes a cylindrical body member adapted to receive said boring bar and having a part compressible upon the boring bar, expansible centering members carried by said body member and adapted to engage the wall of a bearing to be bored, and a single means adjustable to first expand said expansible elements and to then compress said compressible part.

3. In a machine for boring the bearings of an engine cylinder block, a boring bar, and means for centering said boring bar with respect to the bearings to be bored which includes a cylindrical body adapted to fit upon said boring bar, said body having a segmental shank portion externally threaded, a plurality of circumferentially spaced jaw members carried by said body and adapted to be expanded to engage the wall of the bearing to be bored, and a member carried by said threaded shank and adjustable axially thereon to expand said jaws, said member being adapted to compress the segments of said body shank into firm engagement with said boring bar when further expansion of said jaws is prevented by their engagement with the bearing.

4. In a machine for boring the bearings of an engine cylinder block, a boring bar, and means for centering said boring bar with respect to the bearings to be bored which includes a cylindrical body having a shank portion exteriorly threaded and slotted longitudinally to provide a plurality of compressible segments, expansible jaws slidably mounted between said segments and having faces adapted to engage the wall of a bearing to be bored, means for expanding said jaws including a member mounted upon said threaded shank and adjustable longitudinally thereof, said member being adapted when expansion of said jaws is stopped by engagement with a bearing to compress said segments into firm engagement with said boring bar.

5. In a machine for boring the bearings of an engine cylinder block, a boring bar, and means for centering said boring bar with respect to the bearings to be bored, which includes a cylindrical body adapted to freely receive said boring bar and having a head with a reduced shank portion exteriorly threaded and having longitudinal slots at a plurality of points to provide a plurality of compressible segments, said head having tapered seats therein at the ends of and aligned with the slots in said shank portion, a sleeve member having an annular tapered seat at one end thereof slidably mounted on said shank portion, expansible jaw members mounted in said slots and having seat surfaces shaped complementally to and engaging said head and sleeve seats, the outer faces of said jaws being adapted to engage the wall of a bearing to be bored, and an internally threaded member mounted on said threaded shank and engaging said sleeve so that adjustment of said member in one direction moves said sleeve to expand said jaws, the threads of said member cooperating with the threads of said shank to compress said segments toward said boring bar when further expansion of said jaws is prevented by their engagement with a bearing.

6. A centering fixture which comprises a cylindrical body member adapted to rotatably receive a boring bar or the like, said body having a compressible part adapted to engage the boring bar, expansible and contractible members annularly arranged around said body member in equally spaced relation adapted to engage the wall of a bearing to be bored, said members being adapted upon engagement with the bearing wall to center said body within the bearing, and single means carried by said body member and adjustable longitudinally thereof to first expand said expansible members to engage the wall of the bearing and to then compress said compressible part upon the boring bar, thereby to fixedly center said body member both within the bearing and upon the boring bar.

7. A centering fixture of the character described which comprises a cylindrical body member having a plurality of equally spaced compressible segments adapted to receive a boring bar for the boring of a bearing or the like, a plurality of expansible and contractible centering elements carried by said body member, means supporting said centering elements and including a part shiftable along the body member for expanding and contracting said centering elements, and means carried by said body member and shiftable axially therealong for moving said expanding part to expand said centering elements finally to cam said compressible segments inwardly so as to engage and center said body upon a boring bar when the expanding limit of said centering elements has been reached.

8. A centering fixture which comprises a cylindrical body member including a threaded shank portion slitted to provide equally spaced compressible segments, a plurality of centering elements mounted for expansion and contraction movements between said segments, means including an expanding element carried by said threaded shank for expanding and contracting said centering elements, and a member threadedly engaging said threaded shank portion and adjustable axially of said body member for moving said expanding element to expand and contract said centering elements and to force said compressible segments inwardly when expanding movement of said centering elements is stopped by engagement of the latter with a bearing surface or the like.

9. In a machine for boring alined bearings in a work piece, a boring bar, and means for centering said bar in said bearings, which includes a body member adapted to receive said bar and having a part compressible upon said bar, expansible centering means carried by said body member and adapted to engage the wall of a bearing to be bored, and a single member adjustable to first expand said expansible means and then to compress said compressible part.

10. In a machine for boring alined bearings in a work piece, a boring bar, and means for centering said bar in said bearings, which includes a threaded body member adapted to receive said bar and having a part compressible upon said bar, expansible centering means carried by said body member and adapted to engage the wall of a bearing to be bored, and a member threaded on said body member and adapted when turned in one direction first to expand said expansible means and by continued turning in said direction to compress said compressible part.

11. A fixture for centering a boring bar in a bearing, comprising: a threaded body member adapted to receive said bar and having a part compressible upon said bar, expansible centering means carried by said body member and adapted to be expanded into engagement with the wall of a bearing, and a member threaded on said body member and adapted when turned in one direction first to expand said expansible means into engagement with the bearing wall and, by continued turning in said direction, to compress said compressible part into gripping engagement with the boring bar.

12. A fixture for centering a boring bar in a bearing, comprising: a body member having a bore for reception of the boring bar, said body member being radially contractible into gripping engagement with the boring bar and being threaded externally, a plurality of jaws spaced circumferentially about said body member, and means in threaded engagement with the aforementioned thread on said body member for moving said jaws outward radially to engage the bearing wall and for contracting said body member radially to grip the boring bar, said means being operable so to do in response to rotation relatively to said body member.

WALLACE F. MITCHELL.